(12) United States Patent
Choi et al.

(10) Patent No.: US 10,697,501 B2
(45) Date of Patent: Jun. 30, 2020

(54) SYNCHRONIZER OF TRANSMISSION

(71) Applicants: Hyundai Motor Company, Seoul (KR); Kia Motors Corporation, Seoul (KR)

(72) Inventors: Jae Young Choi, Busan (KR); Sung Wha Hong, Gyeonggi-do (KR); Jong Yun Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 129 days.

(21) Appl. No.: 15/820,009

(22) Filed: Nov. 21, 2017

(65) Prior Publication Data

US 2019/0010994 A1    Jan. 10, 2019

(30) Foreign Application Priority Data

Jul. 5, 2017    (KR) .................. 10-2017-0085185

(51) Int. Cl.
*F16D 23/06*    (2006.01)

(52) U.S. Cl.
CPC ...... *F16D 23/06* (2013.01); *F16D 2023/0618* (2013.01)

(58) Field of Classification Search
CPC ........ F16D 23/08; F16D 23/025; F16D 11/14; F16D 23/04; F16D 23/06; F16D 2023/0618
See application file for complete search history.

(56) References Cited

U.S. PATENT DOCUMENTS

| | | | | |
|---|---|---|---|---|
| 2,521,730 | A | * | 9/1950 | Keese ................ F16D 23/08 192/48.91 |
| 4,185,725 | A | * | 1/1980 | Maina ................ F16D 23/06 192/53.31 |
| 4,300,668 | A | * | 11/1981 | Nozawa ............. F16D 23/025 192/53.343 |

(Continued)

FOREIGN PATENT DOCUMENTS

| | | | | |
|---|---|---|---|---|
| DE | 1924724 A1 | * | 11/1969 | ........... F16D 23/025 |
| DE | 2222080 A1 | * | 11/1973 | ............... B21K 1/30 |

(Continued)

OTHER PUBLICATIONS

"Notice of Allowance mailed in U.S. Appl. No. 15/831,267, filed Dec. 4, 2017", dated May 21, 2019, 12 pages.

(Continued)

*Primary Examiner* — David R Morris
(74) *Attorney, Agent, or Firm* — Mintz Levin Cohn Ferris Glovsky and Popeo, P.C.; Peter F. Corless

(57) ABSTRACT

A transmission synchronizer includes a lower key that is installed to be slidable with respect to a hub in a radial direction of the hub and an upper key that is installed on an exterior of the lower key, the upper key being slidable in an axial direction of the hub. Additionally, a sleeve is installed at an exterior of the hub to slide the upper key in the axial direction while the sleeve slides in the axial direction, to pressurize the upper key toward a synchro ring. A key spring installed between the lower key and the hub to pressurize the lower key and the upper key toward an inner surface of the sleeve.

7 Claims, 6 Drawing Sheets

(56) References Cited

U.S. PATENT DOCUMENTS

| | | | | |
|---|---|---|---|---|
| 6,186,301 | B1* | 2/2001 | Schwuger | F16D 23/06 |
| | | | | 192/53.32 |
| 8,104,597 | B2 | 1/2012 | Hackl et al. | |
| 8,459,426 | B2* | 6/2013 | Park | F16D 23/025 |
| | | | | 192/53.341 |
| 8,511,451 | B2 | 8/2013 | Ledetzky et al. | |
| 8,528,435 | B2 | 9/2013 | Hackl et al. | |
| 8,733,523 | B2 | 5/2014 | Pamminger et al. | |
| 10,393,191 | B2* | 8/2019 | Choi | F16D 23/025 |
| 10,393,192 | B2* | 8/2019 | Park | F16D 23/04 |
| 10,400,830 | B2* | 9/2019 | Choi | F16D 23/025 |
| 2008/0066568 | A1 | 3/2008 | Hackl et al. | |
| 2010/0078283 | A1* | 4/2010 | Ledetzky | F16D 23/06 |
| | | | | 192/53.362 |
| 2010/0263979 | A1 | 10/2010 | Pamminger et al. | |
| 2011/0185833 | A1* | 8/2011 | Hackl | F16D 23/06 |
| | | | | 74/339 |
| 2011/0272234 | A1* | 11/2011 | Park | F16D 23/025 |
| | | | | 192/53.341 |
| 2017/0343056 | A1* | 11/2017 | Horiguchi | F16D 23/06 |
| 2018/0045252 | A1* | 2/2018 | Omori | F16D 11/10 |
| 2018/0142740 | A1* | 5/2018 | Park | F16D 23/04 |
| 2018/0372167 | A1* | 12/2018 | Choi | F16D 23/025 |
| 2019/0113084 | A1* | 4/2019 | Choi | F16D 23/06 |

FOREIGN PATENT DOCUMENTS

| | | | | |
|---|---|---|---|---|
| DE | 102008061967 A1 * | 6/2010 | | F16D 23/025 |
| DE | 102010005705 A1 * | 7/2011 | | F16D 23/025 |
| DE | 102015215642 A1 * | 2/2017 | | F16D 23/06 |
| DE | 102015118879 A1 * | 5/2017 | | F16D 23/06 |
| EP | 2475907 B1 | 3/2016 | | |
| JP | 2014-029167 A | 2/2014 | | |
| KR | 10-0379629 B1 | 4/2003 | | |
| KR | 2011-0123967 A | 11/2011 | | |
| KR | 10-1417529 B1 | 7/2014 | | |
| KR | 10-1518120 B1 | 5/2015 | | |
| WO | 2011029490 A1 | 3/2011 | | |
| WO | WO-2011029585 A1 * | 3/2011 | | F16D 23/06 |

OTHER PUBLICATIONS

"Notice of Allowance mailed in U.S. Appl. No. 15/818,640, filed Nov. 20, 2017", dated May 29, 2019, 15 pages.

* cited by examiner

SYNCHRONIZER OF TRANSMISSION

CROSS REFERENCE TO RELATED APPLICATION

The present application claims priority of Korean Patent Application No. 10-2017-0085185 filed on Jul. 5, 2017, the entire contents of which is incorporated herein for all purposes by this reference.

TECHNICAL FIELD

The present disclosure relates to a synchronizer of a transmission and, more specifically, to a structure of a synchronizer applied to a synchromesh type transmission mechanism.

BACKGROUND

A synchromesh type transmission mechanism is configured such that, when a synchronizer ring is pressurized by a key based on an axial movement of a sleeve spline-coupled to a hub, the speeds of the hub, the sleeve, and a clutch gear are synchronized by a frictional force generated between the synchronizer ring and a clutch cone of the clutch gear. Accordingly, the sleeve is coupled to the clutch gear, and consequently a driving force is transferred between the hub and a transmission gear integrally connected to the clutch gear. However, according to the related art, it is difficult to ensure sufficient durability of each component of the transmission mechanism as described above should.

The above description in this background section is merely for improving understanding of the background of the present disclosure, and should not be taken as an acknowledgement indicating that the information forms a prior art that is already known to a person skilled in the art.

SUMMARY

The present disclosure provides a synchronizer of a transmission, which improves the durability of components included in a synchromesh type transmission mechanism and ensures a smooth synchronizing operation.

According to one aspect of the present disclosure, a synchronizer of a transmission of the present disclosure may include a lower key installed to be slidable with respect to a hub in a radial direction of the hub; an upper key installed on an exterior of the lower key, the upper key being slidable in an axial direction of the hub; a sleeve installed at an exterior of the hub to slide the upper key in the axial direction while the sleeve slides in the axial direction, so that the sleeve pressurizes the upper key toward a synchro ring; and a key spring installed between the lower key and the hub to pressurize the lower key and the upper key toward an inner surface of the sleeve.

The lower key may have a receiving groove formed on the exterior thereof, to allow the upper key to be slidable in the axial direction; and the receiving groove may have a radial cross-sectional shape, which is uniform in the axial direction. The radial cross-sectional shape of the receiving groove may be a trapezoidal shape that becomes narrower in a radially inward direction. The upper key may have a radial inner portion stably disposed in the receiving groove, and a radial outside having a cross section taken along the axial direction, the cross section having a trapezoidal shape that becomes narrower in an upward direction and being uniform in a circumferential direction.

The sleeve may have a sleeve groove formed on the inner surface thereof and may have a cross section taken along the axial direction. The cross section of the sleeve groove may have a trapezoidal shape that becomes narrower in an upward direction, and is uniform in the circumferential direction, and thus, an upper side portion of the upper key may be inserted into the sleeve groove. The lower key may have a spring groove which is open in a radially inward direction; and the key spring may include a coil spring which has a first end inserted into the spring groove and a second end elastically supported by the hub and is lengthwise installed in the radial direction. The lower key may have lower key chamfers formed at both circumferential ends thereof, the lower key chamfers having a shape that becomes narrower in a radially inward direction; and the synchro ring may have synchro slopes which correspond to the lower key chamfers and come into surface contact with the lower key chamfers, respectively.

According to the present disclosure, it is possible to improve the durability of components included in a synchromesh type transmission mechanism and ensure a smooth synchronizing operation.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
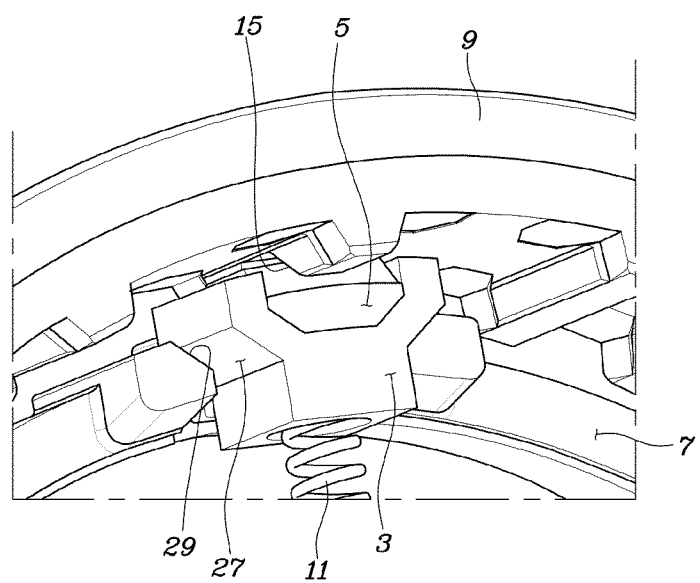
FIGS. 1 to 3 are views illustrating a synchronizer of a transmission according to an exemplary embodiment of the present disclosure.
Figure 2:
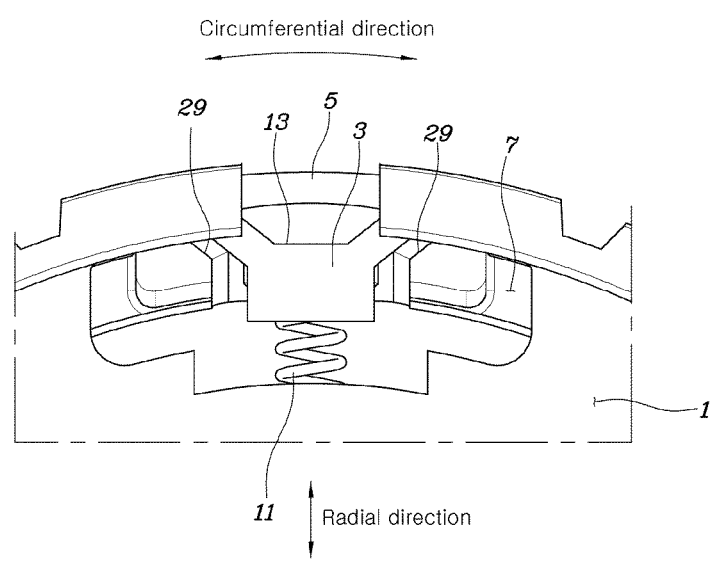
Figure 3:
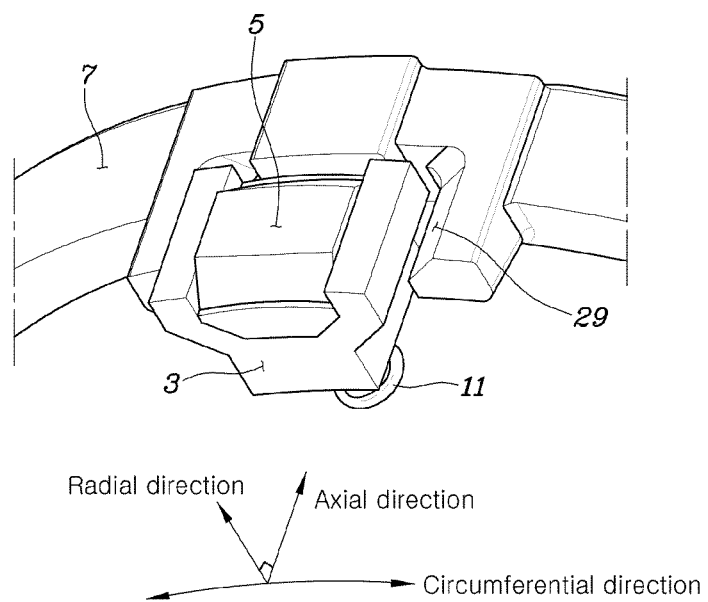
Figure 4:
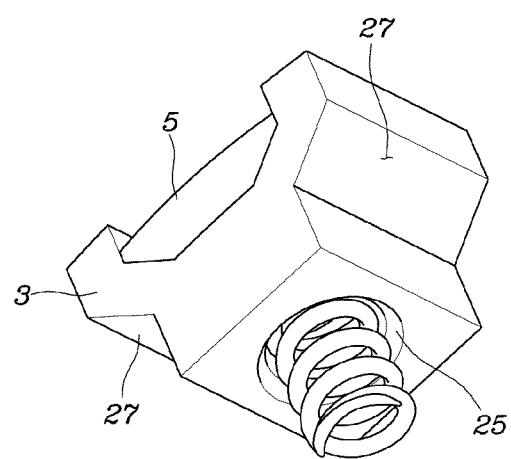
FIG. 4 is a view illustrating a state where an upper key, a lower key, and a key spring are coupled, when viewed from a lower side of the lower key according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Referring to FIGS. 1 to 6, a synchronizer of a transmission according to an exemplary embodiment of the present disclosure may include: a lower key 3 installed to be slidable with respect to a hub 1 in a radial direction of the hub 1; an upper key 5 installed on an exterior of the lower key 3 (e.g., viewed in the radial direction) to be slidable in an axial direction of the hub 1; a sleeve 9 installed at an exterior of the hub 1 to slide the upper key 5 in the axial direction while the sleeve 9 slides in the axial direction to pressurize the upper key 5 by the sleeve 9 toward a synchro ring 7; and a key spring 11 installed between the lower key 3 and the hub 1 to pressurize the lower key 3 and the upper key 5 toward an inner surface of the sleeve 9.

In other words, in the present disclosure, when the sleeve 9 slides in the axial direction, the upper key 5 is moved linearly in the axial direction by the sleeve 9, and the lower key 3 moves linearly only in the radial direction without moving in the axial direction. Accordingly, the key spring 11 that elastically supports the lower key 3 with respect to the hub 1 may expand or compress lengthwise by a predetermined amount in the radial direction during operation of the sleeve 9 and the upper key 5.

As described above, the key spring 11 may expand and compress in a lengthwise direction thereof, without buckling or bending. Therefore, the key spring 11 has an increased durability and thus, may provide a constant elastic force. Consequently, it may be possible to improve the durability of the synchronizer, whereby the durability of the entire transmission may be improved and smooth transmission operation thereof may be ensured.

Furthermore, the lower key 3 may include a receiving groove 13 formed on the exterior thereof (e.g., viewed in the radial direction) to allow the upper key 5 to be slidable in the axial direction. Additionally, the receiving groove 13 may have a radial cross-sectional shape, which is uniform in the axial direction, the radial cross-sectional shape of the receiving groove 13 may be a trapezoidal shape that becomes narrower in a radially inward direction, and the upper key 5 may have a radial inner portion stably disposed in or inserted into the receiving groove 13.

Accordingly, an upper side (e.g., radial exterior) of the upper key 5 may be restrained by the sleeve 9 and a lower side (e.g., radial interior) of the upper key 5 may be stably inserted into the receiving groove 13 of the lower key 3. Therefore, the upper key 5 may smoothly slide on the lower key 3 in the axial direction based on an axial movement of the sleeve 9. Further, shaking or vibration may be prevented from occurring between the upper key 5 and the lower key 3, thereby preventing occurrence of unnecessary noises and ensuring a more stable operability.

Meanwhile, the radial exterior of the upper key 5 has a clubs section taken along the axial direction, the cross section having a trapezoidal shape that becomes narrower in an upward direction and being uniform in a circumferential direction. In addition, the sleeve 9 may include a sleeve groove 15 formed on the inner surface thereof, the sleeve groove 15 may have a class section taken along the axial direction, and the cross section of the sleeve groove 15 may have a trapezoidal shape that becomes narrower in an upward direction, and is uniform in the circumferential direction, and thus, an upper side portion of the upper key 5 may be inserted into the sleeve groove 15.

Figure 5:
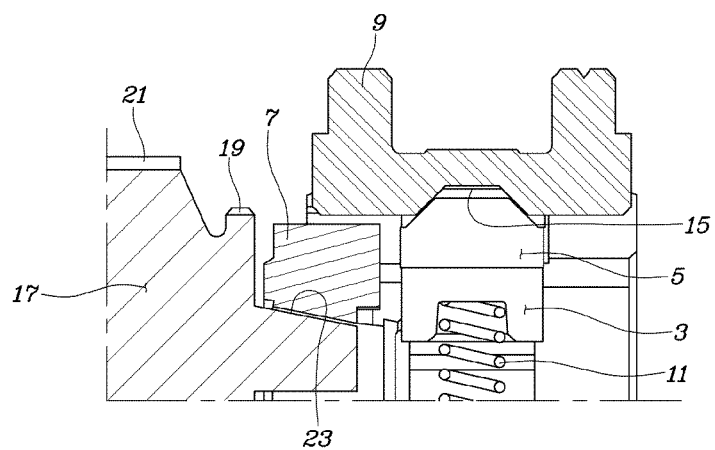
FIG. 5 is a cross sectional view taken along an axial direction of a synchronizer and illustrating a state where a sleeve is in neutral according to an exemplary embodiment of the present disclosure.
Figure 6:
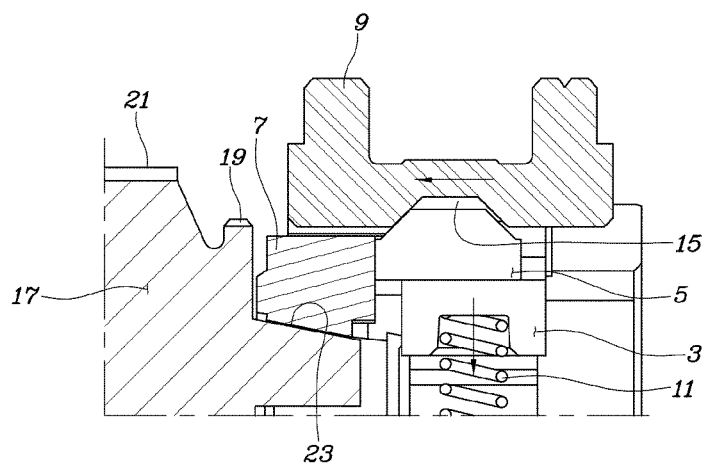
FIG. 6 is a view illustrating an operation when the sleeve slides to the left, as compared to FIG. 5 according to an exemplary embodiment of the present disclosure.

Accordingly, when the sleeve 9 moves linearly in the axial direction, as illustrated in FIG. 6, from the neutral state as illustrated in FIG. 5, the upper key 5 moves linearly in the axial direction together with the sleeve 9 at an initial time. Additionally, when the movement of the upper key 5 is blocked by the synchro ring 7, the sleeve 9 pressurizes the synchro ring 7 in the axial direction through the upper key 5, and simultaneously moves the upper key 5 and the lower key 3 in a radially inward direction, and thus, the sleeve 9 may move over the upper key 5 to be engaged with a clutch gear 19 of a clutch member 17.

For reference, the clutch member 17 in FIGS. 5 and 6 has a configuration including the clutch gear 19, a transmission gear 21, and a frictional cone 23 which are integrated with each other, wherein the clutch gear 19 may be engaged with the sleeve 9, the transmission gear 21 may be engaged with another gear (not illustrated) to form a transmission stage, and the frictional cone 23 forms a frictional force with the synchro ring 7. Meanwhile, the lower key 3 may include a spring groove 25 formed thereon which is open in a radially inward direction. In particular, the key spring 11 may include a coil spring which has a first end inserted into the spring groove 25 and a second end elastically supported by the hub 1 and is installed lengthwise in the radial direction.

As described above, with respect to an axially linear sliding movement of the sleeve 9 and the resulting radial movement of the upper key 5 and the lower key 3, the coil spring may be expanded and compressed in the radial direction, without buckling or bending. Therefore, the durability of the coil spring is secured, and the coil spring is maintained at a state where the coil spring may provide a constant elastic force.

Further, the lower key 3 may have lower key chamfers 27 formed at both circumferential ends thereof, the lower key chamfers 27 having a shape that becomes narrower in a radially inward direction. The synchro ring 7 may have synchro slopes 29 which correspond to the lower key chamfers 27 and come into surface contact with the lower key chamfers 27, respectively. Accordingly, when the sleeve 9 moves from a neutral position toward the synchro ring 7, the upper key 5 pressurizes the synchro ring 7 toward the clutch member 17 while moving linearly together with the sleeve 9 in the axial direction, and thus, the synchro ring 7 generates a frictional force between the synchro ring 7 and the frictional cone 23 of the clutch member 17. Ultimately, the speeds of the hub 1 and the clutch member 17 are synchronized.

The frictional force may be applied to a part between the synchro slope 29 and the lower key chamfer 27. Therefore, before the synchronization is complete, the frictional force prevents the lower key 3 from further moving in a radially inward direction, and when the frictional force is decreased by completion of the synchronization, the lower key 3 allows the lower key chamfer 27 to slide along the synchro slope 29 and simultaneously move in a radially inward direction together with the upper key 5. Accordingly, the sleeve 9 moves over the upper key 5 and then moves linearly to be engaged with the clutch gear 19 of the clutch member 17, and thus, transmission operation may be completed.

An exemplary embodiment of the present disclosure has been illustrated and described, but various changes and modifications would be obvious to a person ordinarily skilled in the art without departing from the technical idea of the present disclosure, provided by the following claims.

What is claimed is:

1. A synchronizer of a transmission, comprising:
a lower key installed to be slidable with respect to a hub in a radial direction of the hub;
an upper key installed on an exterior of the lower key, the upper key being slidable independent of the lower key in an axial direction of the hub;
a sleeve installed at an exterior of the hub to slide the upper key in the axial direction while the sleeve slides in the axial direction to pressurize the upper key toward a synchro ring; and
a key spring installed between the lower key and the hub to pressurize the lower key and the upper key toward an inner surface of the sleeve,
wherein the lower key includes a receiving groove formed on the exterior thereof to allow the upper key to be slidable in the axial direction and the receiving groove has a radial cross-sectional shape which is uniform in the axial direction.

2. The synchronizer of claim 1, wherein the radial cross-sectional shape of the receiving groove is a trapezoidal shape that becomes narrower in a radially inward direction.

3. The synchronizer of claim 1, wherein the upper key has a radial inner portion inserted into the receiving groove, and a radial exterior having a cross section taken along the axial direction, the cross section having a trapezoidal shape that becomes narrower in an upward direction and being uniform in a circumferential direction.

4. The synchronizer of claim 3, wherein the sleeve includes a sleeve groove formed on the inner surface thereof, the sleeve groove has a cross section taken along the axial direction, and the cross section of the sleeve groove has a trapezoidal shape that becomes narrower in an upward direction, and is uniform in the circumferential direction, to insert an upper side portion of the upper key into the sleeve groove.

5. The synchronizer of claim 1, wherein the lower key includes a spring groove which is open in a radially inward direction and the key spring includes a coil spring which has a first end inserted into the spring groove and a second end elastically supported by the hub and is installed lengthwise in the radial direction.

6. The synchronizer of claim 1, wherein the lower key includes lower key chamfers formed at both circumferential ends thereof, the lower key chamfers having a shape that becomes narrower in a radially inward direction and the synchro ring includes synchro slopes which correspond to the lower key chamfers and come into surface contact with the lower key chamfers, respectively.

7. A vehicle having a transmission synchronizer according to claim 1.

* * * * *